March 20, 1951     C. GERST     2,546,064
TRANSMISSION

Filed Jan. 2, 1948     5 Sheets-Sheet 1

INVENTOR.
CHRIS GERST
BY
Gustav A. Wolff
ATT.

March 20, 1951 C. GERST 2,546,064
TRANSMISSION
Filed Jan. 2, 1948 5 Sheets-Sheet 4

INVENTOR.
CHRIS GERST
BY
Gustav A. Wolf
ATT.

March 20, 1951 C. GERST 2,546,064
TRANSMISSION
Filed Jan. 2, 1948 5 Sheets-Sheet 5

INVENTOR.
CHRIS GERST
BY
Gustav A. Wolff
ATT.

Patented Mar. 20, 1951

2,546,064

UNITED STATES PATENT OFFICE 2,546,064

TRANSMISSION

Chris Gerst, Detroit, Mich., assignor to The Transmission & Gear Company, Dearborn, Mich., a corporation of Michigan Application January 2, 1948, Serial No. 105

3 Claims. (Cl. 192—4)

This invention relates in general to reversing mechanism in which independently rotatable driving and driven members are selectively coupled with each other by a clutch device, and more particularly, to a reversible transmission in which driving and driven members are coupled with each other by a dual friction clutch of the type disclosed in my copending applications Serial No. 728,842 filed February 15, 1947 and Serial No. 784,681 filed November 7, 1947. This type of dual frictional clutch includes a pressure plate structure with axially spaced pressure plates, and a backing plate structure positioned between the pressure plates for cooperation of the pressure plate structure with the backing plate structure in selectively actuating clutch disk assemblies of the dual friction clutch by shifting of the pressure plate structure in opposite directions.

The primary object of the present invention is the provision of a reversible transmission embodying angularly related input and output shafts coupled with each other by gearing, intermediate shaft means and a dual friction clutch, in which transmission the intermediate shaft means mounts the dual friction clutch and clutch members of the dual friction clutch are in selective driving engagement with symmetrically arranged bevel gears rotated in opposite direction, with respect to each other, by the input shaft for selective rotation of the intermediate shaft means and the output shaft coupled therewith by actuation of the dual friction clutch.

Another object of the invention is the provision of a reversible transmission embodying angularly related input and output shafts and an intermediate shaft arranged parallel to the output shaft and coupled therewith, in which transmission the intermediate shaft is coupled with the input shaft by axially spaced bevel gears meshing a bevel pinion on the input shaft and rotated by said bevel pinion in opposite directions, and in which dual friction clutch means are mounted on the intermediate shaft and includes clutch members coupled with the bevel gears to effect the desired rotation of the intermediate shaft and output shaft by actuation of the dual friction clutch means.

A further object of the invention is the provision of a reversible transmission embodying angularly related input and output shafts coupled with each other by gearing, intermediate shaft means and a dual friction clutch, in which transmission the intermediate shaft means are coupled with the input shaft by axially spaced, parallel bevel gears meshing a bevel pinion on the input shaft and a second bevel pinion on a power take-off shaft, in which the bevel pinion on the input shaft effects rotation of the bevel gears in opposite directions with respect to each other, and in which the dual friction clutch is mounted on the intermediate shaft means and includes clutch members coupled with the bevel gears to effect the desired rotation of the intermediate shaft and the output shaft by actuation of the dual friction clutch.

Still another object of the invention is a reversible transmission of the type referred to above which is provided with brake means adapted to stop rotation of the dual friction clutch and controlling means for the clutch and the brake means, with the controlling means arranged to stop rotation of the clutch and intermediate shaft when clutching action of the dual friction clutch is stopped by its controlling means.

With the above and other incidental objects in view, the invention has other marked improvements and superiorities which radically distinguish it from presently known structures. These improvements or superior characteristics, embodying certain novel features of construction, are clearly set forth in the appended claims; and a preferred embodiment of the invention is hereinafter shown with reference to the accompanying drawings, forming part of the specification.

Figure 1:
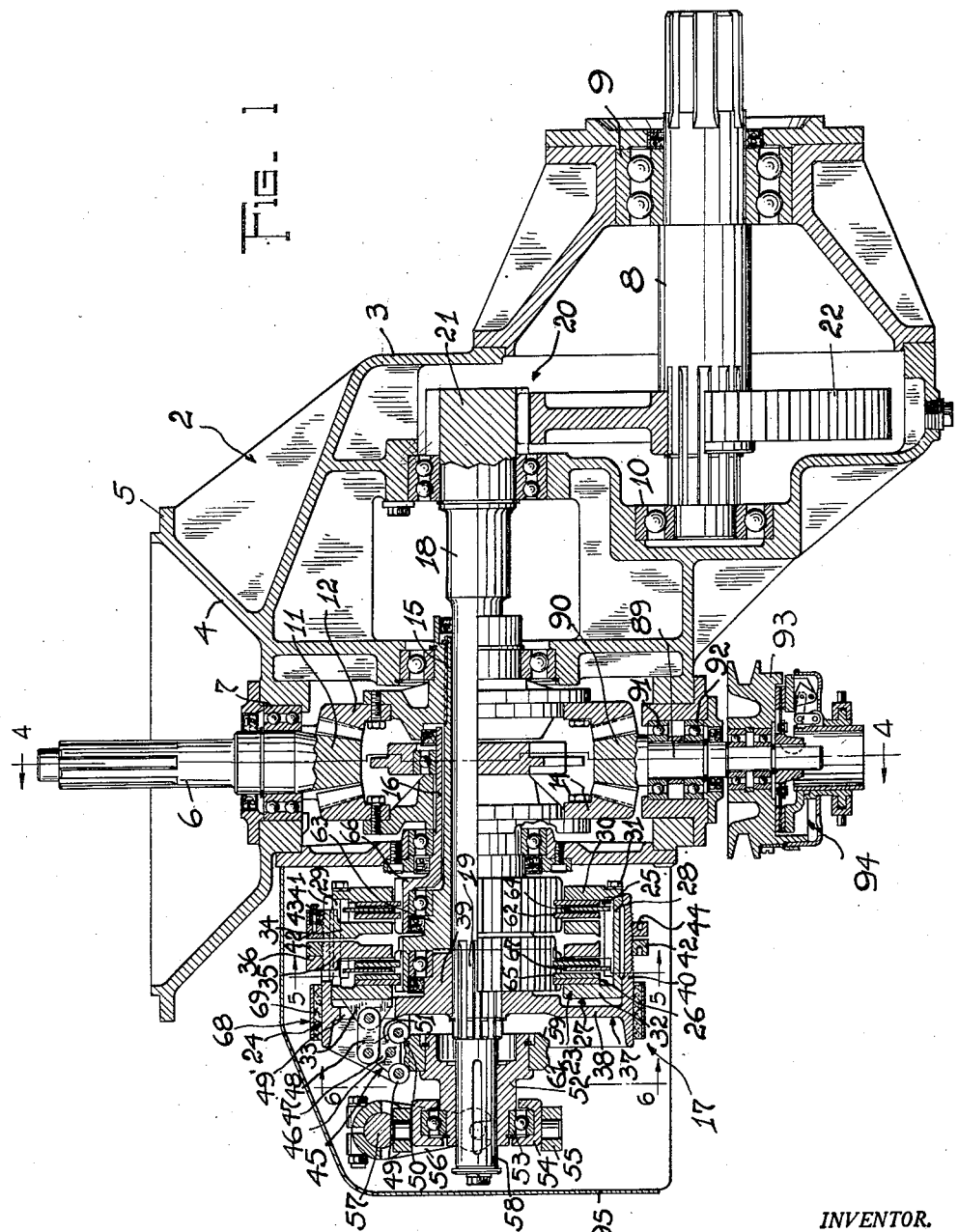
Fig. 1 is a longitudinal sectional view through a reversible right angle transmission constructed in accordance with the invention, the section being taken on line 1—1 of Fig. 2 of the drawings.
Figure 2:
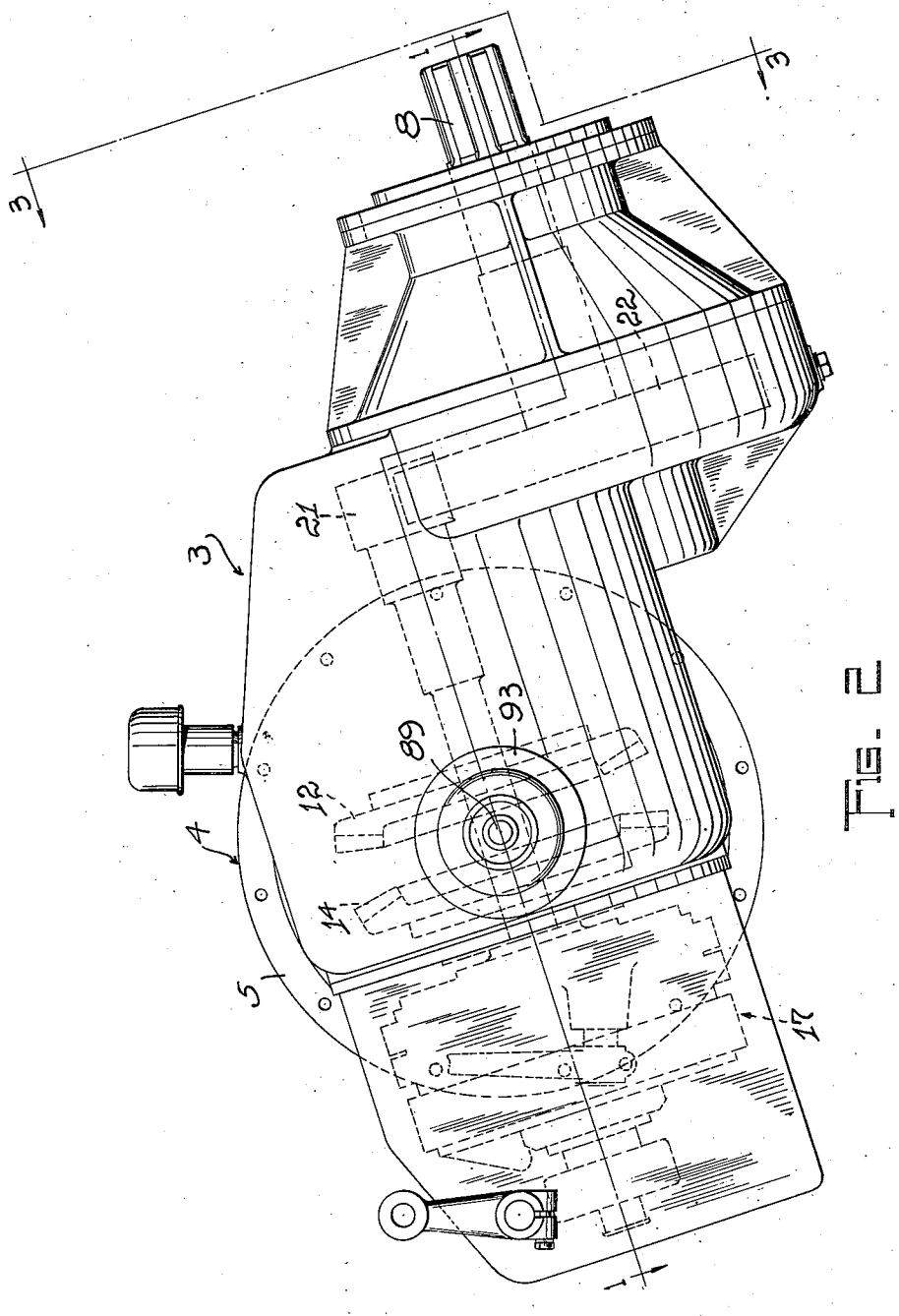
Fig. 2 is a front view of the reversing transmission shown in Fig. 1.
Figure 3:
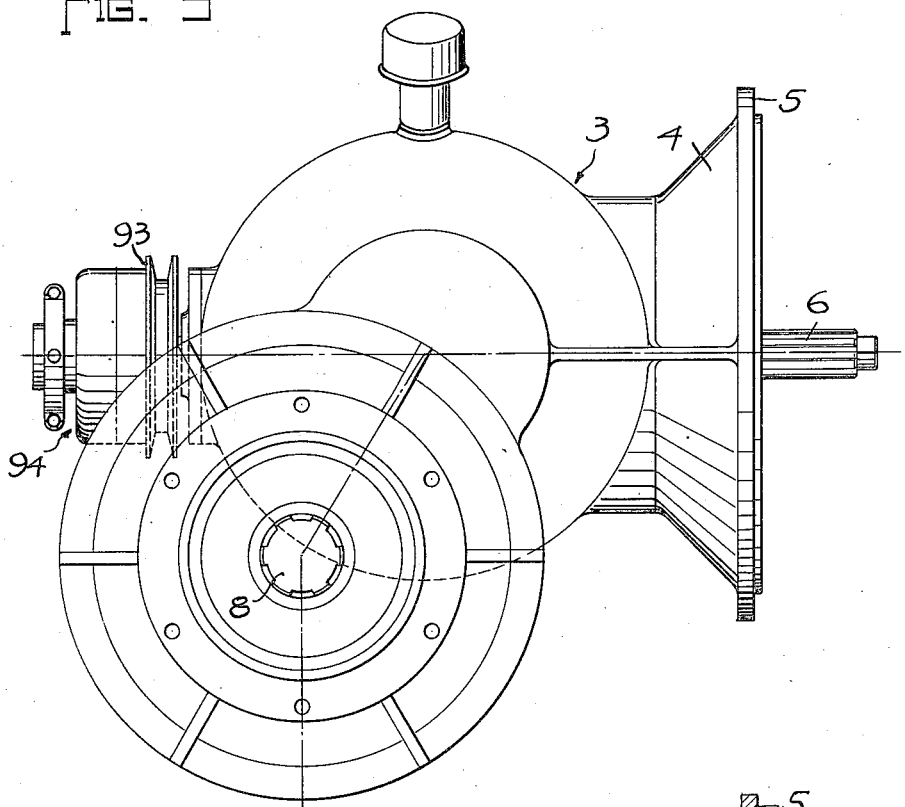
Fig. 3 is an end view of the transmission shown in Fig. 2, the view being taken from line 3—3 indicated in Fig. 2 of the drawings.
Figure 4:
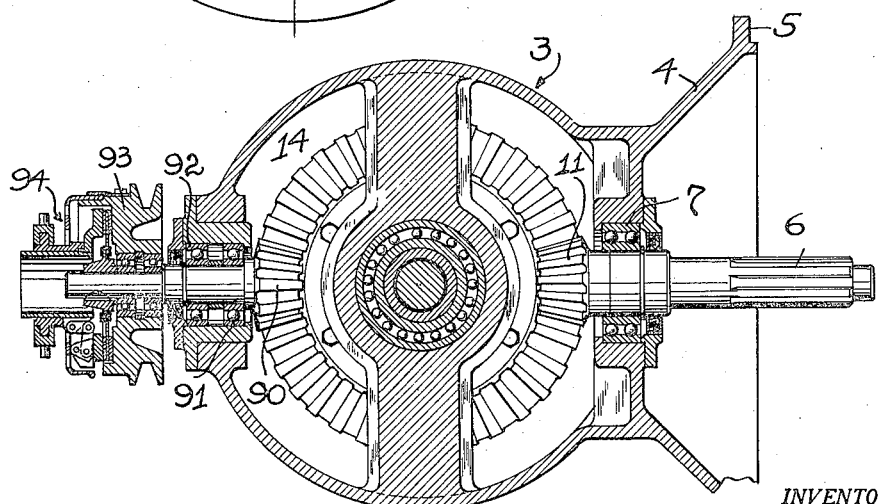
Fig. 4 is a sectional view on line 4—4 of Fig. 1.
Figure 5:
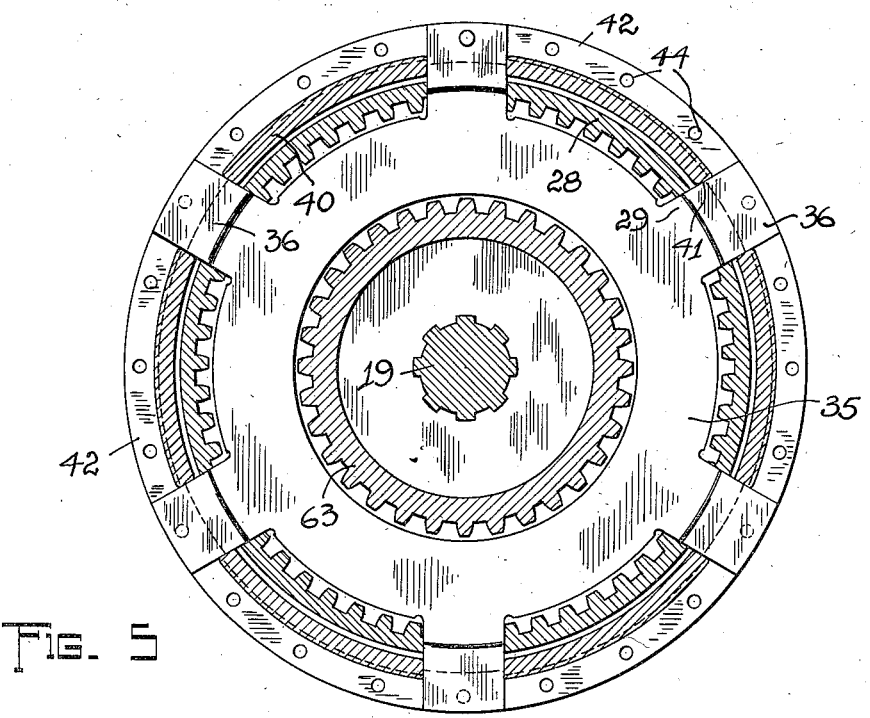
Fig. 5 is a sectional view through the dual friction clutch of the transmission, the section being taken on line 5—5 of Fig. 1.
Figure 6:
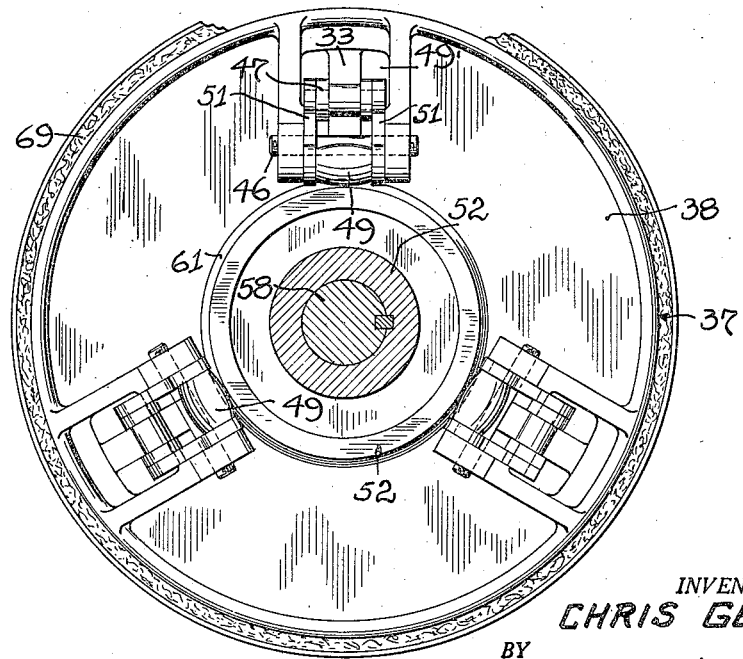
Fig. 6 is another sectional view through the dual friction clutch of the transmission, the section being taken on line 6—6 of Fig. 1.

Referring now more in detail to the exemplified form of transmission shown in the drawings, reference numeral 2 denotes right angle reversing transmission embodying a housing 3, the bell portion 4 of which is adapted to be secured with its flange 5 to the housing of a motor (not shown). Housing 3 rotatably supports at its rear side a short input shaft 6 mounted in a ball bearing 7 and outwardly extended through bell portion 4 for coupling with a motor shaft (not shown), and at its rear end an output shaft 8 mounted in ball bearings 9 and 10 and outwardly extended for coupling with a mixing drum (not shown). The thus journaled input and output shafts 6 and 8 are angularly related to each other and coupled with each other for selective rotation in opposite directions by mechanism hereinafter to be described.

Input shaft 6 is provided at its inner end with a bevel pinion 11 extended between and meshing two axially aligned, spaced bevel gears 12 and 14, the axes of which are rectangularly related to the axis of input shaft 6. Bevel gears 12 and 14 are rotated in opposite directions by input shaft 6 and secured to concentrically arranged tubular shafts 15 and 16 of a dual friction clutch structure 17 axially aligned with an intermediate shaft 18 and mounted on the splined end portion 19 thereof. Shaft 18 is journaled in housing 3 and coupled with output shaft 8 by gearing 20 consisting of a pinion 21 on intermediate shaft 18 and a gear 22 on output shaft 8 meshing pinion 21.

The dual friction clutch structure 17 embodies a pressure plate structure 23 and a backing plate structure 24 slidably and non-rotatably coupled with each other for joint rotation with intermediate shaft 18. Pressure plate and backing plate structures 23 and 24 are non-rotatably and axially shiftably interengaged with each other in such a manner that the backing plate structure extends substantially within the pressure plate structure to permit selective coupling of intermediate shaft 18 with either one of two individual clutch disk assemblies 25 and 26 arranged within the pressure plate structure at opposite sides of the backing plate structure.

The pressure plate structure 23 consists of a cylindrical body 27, the peripheral wall 28 of which is radially slotted to provide body 27 with a plurality of radial slots 29. This body has its one end partly closed by a ring-shaped plate 30, secured to body 27 by bolts 31, and its other end inwardly flanged to provide the body with a flanged portion 32 opposed to ring-shaped plate 30. In addition body 27 includes ear portions 33 integrally extended from the outside face of flanged portion 32.

The thus constructed pressure plate structure is slidably and non-rotatably engaged with the backing plate structure 24 which includes backing plates 34, 35 positioned between the ring-shaped plate 30 and the flanged portion 32 of the pressure plate structure and slidably and non-rotatably engaged with the peripheral wall 28 of the pressure plate structure by radial driving lugs 36 extended through the radial slots 29.

The backing plate structure 24 embodies a cup-shaped body 37 which is dimensioned to be sleeved upon the body 27 of pressure plate structure 23 and has extended from its wall 38 an internally splined hub member 39 mounting body 37 on the splined portion 19 of intermediate shaft 18. The peripheral wall 40 of body 37 is externally threaded and in addition radially slotted to provide said wall with a plurality of slots 41 sized and arranged to fit and align with the radial slots 29 in the body 27 of the pressure plate structure 23 to permit proper engagement of body 37 with the driving lugs 36 on the backing plates 34, 35. These backing plates extend between the ring-shaped plate 30 and the flanged portion 32 of the pressure plate structure and are held in proper position by adjustment rings 42 threadedly engaged with the peripheral wall of body 37 and held in adjusted position by spring-pressed plunger 43 extended into circumferentially arranged bores 44 in the side walls of adjusting rings 42. Such mounting of backing plates 34 and 35 permits adjustment of the relative clamping position between the pressure plates and the backing plates, and such adjustment is effected by shifting the backing plates to the desired position by rotation of adjustment rings 42 threadedly engaged with the body 37 of the backing plate structure.

Shifting of the pressure plates in opposite directions to actuate either one of the two clutch disk assemblies 25 and 26, later to be described, is effected by dual clutch levers 45 pivotally mounted on pins 46 which are supported in pairs of parallel ribs extended in symmetrical arrangement from the rear wall 38 of body 37. These dual clutch levers include third lever arms 47 linking the dual clutch levers to the ear portions 33 of the body 27 of pressure plate structure 23 by means of links 48 which are extended through openings 49' in the rear wall 38. The dual clutch levers 45 each embody a pair of rollers 49 and 50 rotatably mounted between oppositely arranged plates 51 and are actuated by a shifting member 52 which is coupled by a ball bearing 53 with a throw-out collar 54 actuated by a fork 55 on a lever 56 mounted on a shaft 57. The shifting member 52 is slidably keyed to the reduced end portion 58 of the intermediate shaft 18 and, when shifted toward the two-way clutch structure engages with its inclined surface 59 the rollers 50 of the dual clutch levers and tilts these levers so as to effect shifting of the pressure plate structure toward the left until the clutch disk assembly 25 is tightly gripped between ring-shaped plate 30 and backing plate 34. When shifting member 52 is shifted in the opposite direction, away from the two-way clutch structure, rollers 50 engage the oppositely inclined surface 61 of the shifting member and tilts the dual clutch levers so as to effect shifting of the pressure plate structure toward the right until the clutch disk assembly 26 is tightly gripped between flanged portion 32 and backing plate 35.

Coupling of the two-way clutch structure with the input shaft 6 is effected by the clutch disk assemblies 25 and 26. Thus, clutch disk assembly 25 includes friction driving disks 62, non-rotatably and axially shiftably engaged with the enlarged splined end portion 66 of tubular shaft 16, which is coupled with bevel gear 14 and concentrically encircles the tubular shaft 15 and intermediate shaft 18, and a friction driven disk 64, non-rotatably and axially shiftably engaged with the internally toothed peripheral wall 28 of body 27; and the clutch disk assembly 26 includes friction driving disks 65, non-rotatably and axially shiftably engaged with the enlarged splined end portion 63 of tubular shaft 15, which is coupled with bevel gear 12 and concentrically encircles the intermediate shaft 18, and a friction driven disk 67 non-rotatably and axially shiftably engaged with the internally toothed peripheral wall 28 of body 27.

The tubular shaft 15, which is the forward drive shaft, is keyed to bevel gear 12 and actuates the intermediate shaft 18 when the clutch disk assembly 26 is actuated by moving the shifting cone or member 52 away from the clutch structure to tightly grip this clutch disk assembly between the flanged portion 32 and backing plate 35. In this case rotation of input shaft 6 is transferred over bevel gear 12, tubular shaft 15, clutch disk assembly 26, body 37 and its hub member 39 to the intermediate shaft 18 and hence through gearing 20 to the output shaft 8.

The tubular shaft 16, which is the reverse drive shaft is keyed to bevel gear 14 and actuates the intermediate shaft 18 when the clutch disk assembly 25 is actuated by moving shifting cone or member 52 toward the clutch structure to tightly grip this clutch disk assembly between the ring-shaped plate 30 and backing plate 34. In this case rotation of input shaft 6 is transferred over bevel gear 14, tubular shaft 16, clutch disk assembly 25, body 37 and its hub member 39 to the intermediate shaft 18 and hence through gearing 20 to the output shaft 8.

Figure 7:
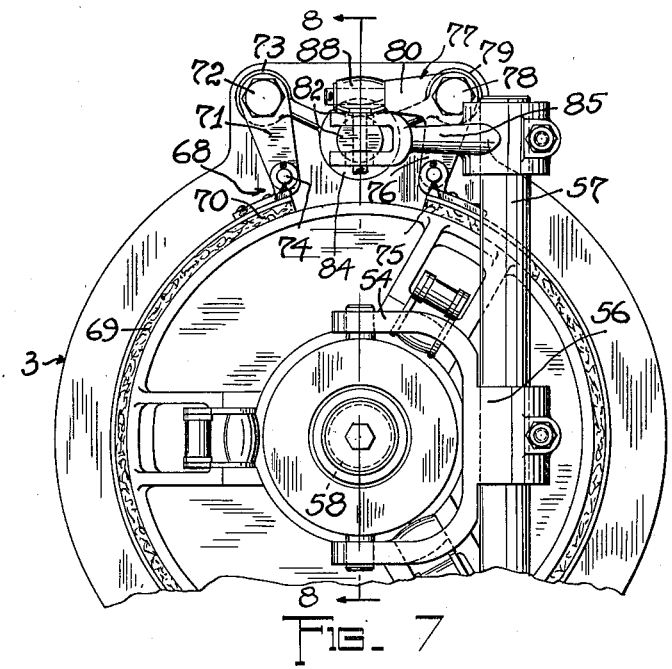
Fig. 7 is an enlarged end view of the dual friction clutch showing the coupled operating means for the clutch and brake.
Figure 8:
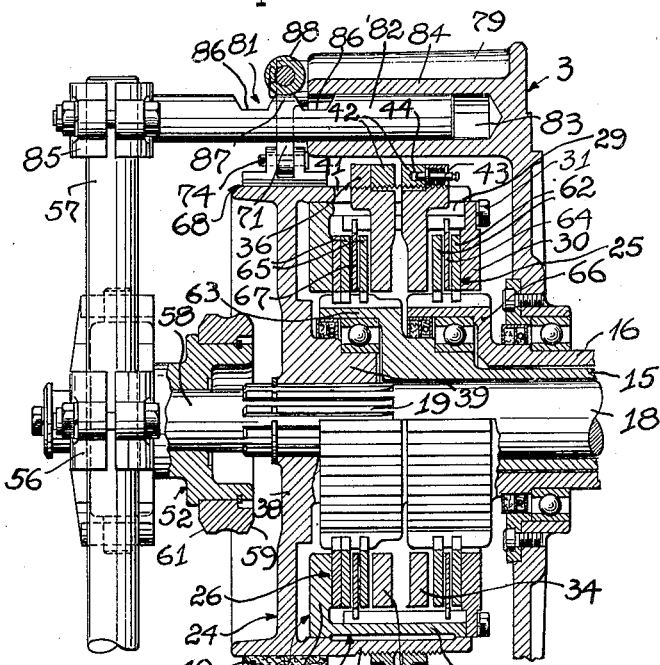
Fig. 8 is a sectional view, partly in elevation on line 8—8 of Fig. 7.

In the described two-way clutch structure the clutch disk assemblies cannot be actuated upon simultaneously and, therefore, a change of rotation of output shaft 8 can be effected without damage to the rotary parts. To more effectively stop rotation of the clutch structure during quick shifting operations, there is provided a brake mechanism 68, the brake band 69 of which embraces cup-shaped body 37, see Figs. 7 and 8. Brake band 69 has its one end 70 connected to housing 3 by an attachment member 71 which is secured by bolt 72 to a stud 73 on said housing and is coupled with the end 70 of the brake band by a pin 74. The other end 75 of brake band 69 is coupled with one arm 76 of a bell crank 77 pivoted on a bolt 78 secured to another stud 79 on housing 3 to effect tensioning of the brake band when bell crank 77 is pivoted upwardly by engagement of its other arm 80 with the cam portion 81 of an axially shiftable cam rod 82 slidably mounted in the cylindrical bore 83 of a stud 84 on housing 3. This cam rod is shifted by a fork-shaped lever 85 secured to shaft 57 for simultaneous cooperation with lever 56 actuating dual friction clutch structure 17. The cam porbtion2 81 of cam rod 82 embodies two spaced, cutout portions 86, 86' and a slightly grooved portion 87 arranged between the cutout portions and cooperates with a roller 88 on arm 80 of bell crank 77. Thus, in neutral position of the dual clutch structure 17, roller 88 rests on the grooved portion 87 to effect braking action of brake band 69 and in forward or reverse position of the dual clutch structure 17 roller 88 rests in one or the other of the cutout portions 86, 86' to fully release any braking action of brake band 69.

The described reversing transmission, which forms a compact and simple unit, is economical in manufacture and service as the two-way clutch structure which is covered by a hood-shaped cover member 95 is freely accessible due to its outside location.

Preferably the described reversing transmission incorporates a power take-off shaft 89 for driving a pump or any other device. This power take-off shaft is rotated with the same speed as the input shaft 6 and for such purpose has its inner end provided with a bevel pinion 90 extended between and meshing the bevel gears 12 and 14. The power take-off shaft is journaled in housing 3 by ball bearings 91, 92 and freely, rotatably supports a pulley 93 adapted to be selectively coupled with the power take-off shaft by a single disk clutch 94.

Having thus described my invention, what I claim is:

1. In a reversible transmission a driving member, a driven member, two axially aligned, spaced and oppositely arranged bevel gears directly driven in opposite directions by said driving member, dual friction clutch means, an intermediate rotary member geared at its one end to said driven member and mounting on its other end said dual friction clutch means, shifting means to selectively actuate the clutch members of said dual friction clutch means, and a power take-off shaft arranged between and directly driven by said bevel gears said dual friction clutch means including driving clutch members secured by tubular members to said oppositely rotating bevel gears and driven clutch members secured to said intermediate rotary member and said dual friction clutch means being adapted to effect rotation of said intermediate rotary member and the driven member geared thereto in the desired direction by selective shifting of the shifting means for said dual friction clutch means.

2. In a reversible transmission a drive shaft, a driven shaft, two axially aligned, spaced rotary members having their axes rectangularly related to the axis of said drive shaft and driven thereby in opposite directions, an intermediate shaft geared with its one end portion to said driven shaft and axially aligned with said rotary members, a dual friction clutch means, including a backing plate structure rigidly mounted on the other end portion of said intermediate shaft in laterally offset relation to said rotary members, brake means encircling said backing plate structure, actuating means for said dual clutch mechanism shiftable in opposite directions, axially aligned tubular members keyed to said rotary members and slidably and non-rotatably supporting at their free ends driving clutch members and driven clutch members slidably and non-rotatably supported by said backing plate structure and adapted to cooperate in clutching operations with said driving clutch members, said actuating means when shifted in opposite directions effecting selective coupling of said intermediate shaft with either one of said rotary members, and coupling means connecting said brake means with said actuating means for braking action on said backing plate structure when said dual clutching means are in neutral position.

3. In a reversible transmission a housing, a first shaft in said housing extended therefrom through one wall thereof, a second shaft in said housing angularly intersecting the axis of said first shaft and extended from said housing through another wall thereof angularly related to said first wall, two spaced, oppositely arranged bevel gears axially aligned with respect to said first shaft for rotation in opposite directions, dual friction clutch means mounted on the outwardly extended end portion of said second shaft, said dual friction clutch means including a backing plate structure and driving clutch members coupled with said spaced bevel gears by tubular shafts encircling said second shaft, said backing plate structure including a cup-shaped housing rigidly mounted on the extended end portion of said second shaft and backing plate means supported by said housing, brake band means encircling the said cup-shaped housing and actuating means for said dual friction clutch means coupled with said brake band means for actuation of said brake band means in predetermined position of said dual friction clutch means.

CHRIS GERST.

REFERENCES CITED

The following references are of record in the file of this patent:

UNITED STATES PATENTS

| Number | Name | Date |
|---|---|---|
| 687,474 | Broberg | Nov. 26, 1901 |
| 1,130,134 | Baldwin | Mar. 2, 1915 |
| 1,136,279 | Severy | Apr. 20, 1915 |
| 1,609,782 | Small | Dec. 7, 1926 |
| 1,788,938 | Zetterlund | Jan. 13, 1931 |
| 1,887,789 | Rush | Nov. 15, 1932 |
| 2,323,753 | Jaeger | July 6, 1943 |
| 2,330,296 | Lundberg | Sept. 28, 1943 |
| 2,379,023 | Miller | June 26, 1945 |

FOREIGN PATENTS

| Number | Country | Date |
|---|---|---|
| 341,177 | Great Britain | Jan. 15, 1931 |
| 473,229 | Great Britain | Oct. 8, 1937 |